United States Patent

Stelzer et al.

[11] Patent Number: 6,064,518
[45] Date of Patent: May 16, 2000

[54] BEAM DEFLECTING UNIT FOR MULTIPLE-AXIS EXAMINATION IN A MICROSCOPE

[75] Inventors: Ernst H. K. Stelzer, Meckesheim; Steffen Lindek, Plankstadt, both of Germany

[73] Assignee: Carl Zeiss Jena GmbH, Jena, Germany

[21] Appl. No.: 09/051,374

[22] PCT Filed: Jul. 22, 1997

[86] PCT No.: PCT/EP97/03953

§ 371 Date: Jul. 28, 1998

§ 102(e) Date: Jul. 28, 1998

[87] PCT Pub. No.: WO98/07059

PCT Pub. Date: Feb. 19, 1998

[30] Foreign Application Priority Data

Aug. 8, 1996 [DE] Germany ............... 196 32 040

[51] Int. Cl.$^7$ ............................................. G02B 21/00
[52] U.S. Cl. .................................. 359/368; 359/389
[58] Field of Search ........................ 359/225, 372, 359/385, 387, 389, 368

[56] References Cited

U.S. PATENT DOCUMENTS

| | | | |
|---|---|---|---|
| 3,843,227 | 10/1974 | Kato et al. | 359/387 |
| 4,127,318 | 11/1978 | Determann et al. | |
| 4,353,618 | 10/1982 | Hagner et al. | 359/385 |
| 4,687,304 | 8/1987 | Piller et al. | 359/387 |
| 4,737,022 | 4/1988 | Faltermeier et al. | 359/387 |
| 5,011,243 | 4/1991 | Doyle et al. | 359/356 |
| 5,039,214 | 8/1991 | Nagata et al. | 359/386 |
| 5,253,106 | 10/1993 | Hazard | 359/368 |
| 5,351,169 | 9/1994 | Ishikawa et al. | 362/32 |
| 5,592,328 | 1/1997 | Greenberg | 359/389 |
| 5,715,081 | 2/1998 | Chastang et al. | 359/385 |

FOREIGN PATENT DOCUMENTS

| | | |
|---|---|---|
| 3151837 | 10/1982 | Germany . |
| 4326473 | 2/1995 | Germany . |

*Primary Examiner*—Cassandra Spyrou
*Assistant Examiner*—Mark A. Robinson
*Attorney, Agent, or Firm*—McAulay Nissen Goldberg Kiel & Hand, LLP

[57] ABSTRACT

A beam deflecting unit for multiple-axis examination of specimens in a microscope is disclosed which, on the one hand, enables the illumination and/or observation of the specimen from several sides and, on the other hand, allows observation of the specimen at an angle to the illumination axis. The examination of the specimen is carried out with an available microscope and with the beam deflecting unit according to the invention which is located between the microscope objective and the focal plane.

11 Claims, 3 Drawing Sheets

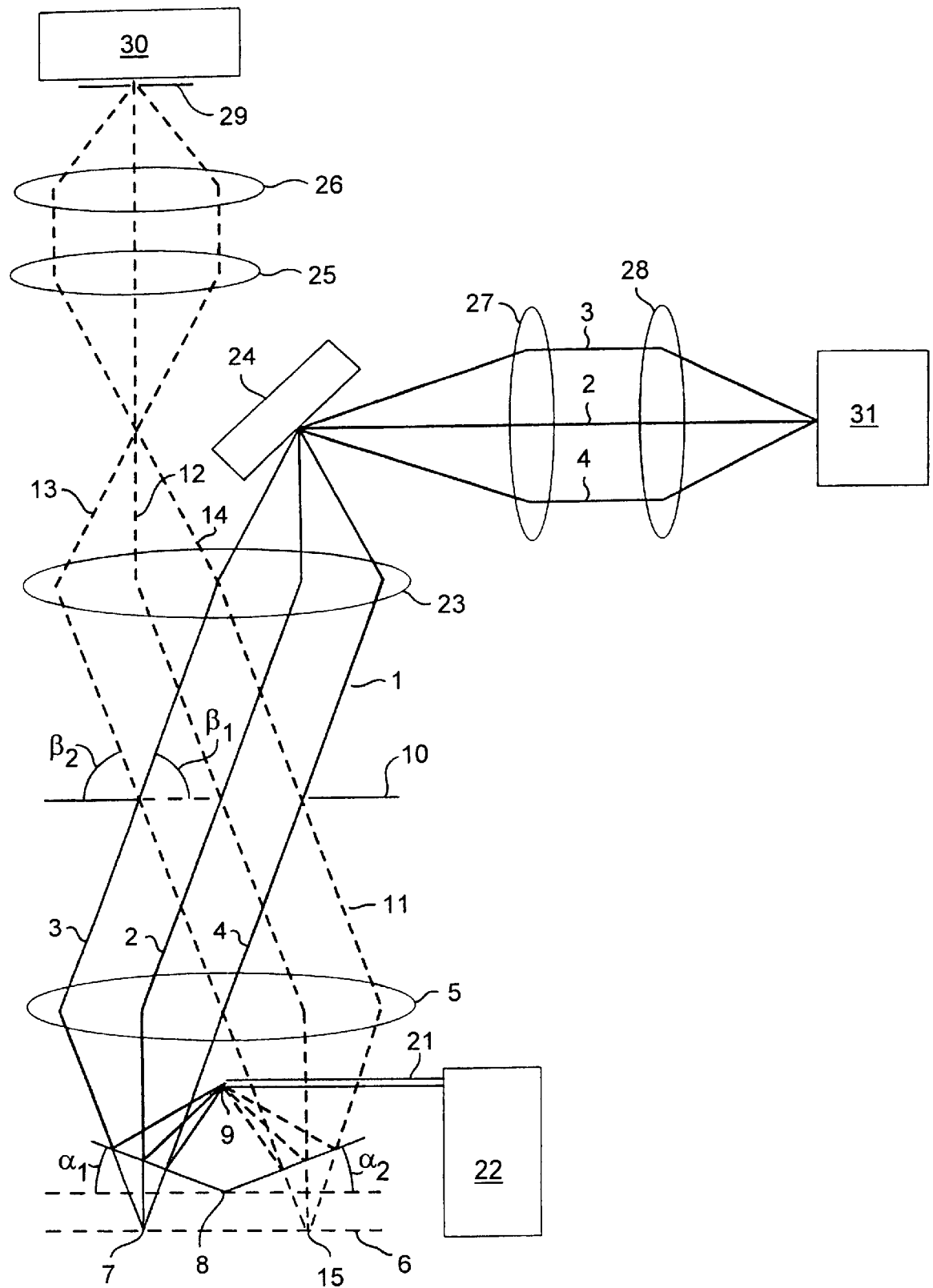
F I G. 1

BEAM DEFLECTING UNIT FOR MULTIPLE-AXIS EXAMINATION IN A MICROSCOPE

BACKGROUND OF THE INVENTION

1. Field of the Invention

The invention is directed to a beam deflecting unit for multiple-axis examination of specimens in a microscope which, on the one hand, enables the illumination of the specimen by one or more beams from several sides and/or observation of the specimen by one or more beams from several sides and, on the other hand, allows observation of the specimen at an angle to the illumination axis. The beam deflecting unit according to the invention can be used in available far-field raster scanning light microscopes and is situated between the microscope objective and the focal plane. It is adapted to the size ratios of the specimen and of the free working length of the objective.

2. Description of the Related Art

Technical scientific literature discloses confocal scanning light microscopes which have a resolution along the optical axis (axial resolution) and can generate images with an appreciably reduced depth of focus. A problem arises. in that the microscope objectives detect only a part of the total solid angle and accordingly detect only a portion of the light which is radiated in all directions from a point. As a result, the axial resolution is at least three-times worse than the axial resolution. Generally, the ratio is greater.

For an additionally increased resolution in the axial direction, a double-confocal scanning light microscope that was suggested in DE-OS 40 40 441 is characterized by the use of a second objective on the other side of the object plane, wherein both objectives illuminate a common object point simultaneously and/or detect the light proceeding from it. In the case of a coherent illumination of the object by the two objectives, the observation volume is reduced by interference along the optical axis. The reduction in observation volume is synonymous with an improvement in resolution.

Further, DE-OS 43 26 4731 discloses a scanning light microscope in which at least two objectives are arranged in such a way that they illuminate an object point simultaneously and/or collect the light proceeding from the object point, wherein at least two of the objectives do not lie on a common axis. In addition, as is the case in a double-confocal scanning light microscope, means for changing interference can be arranged in such a way that light passing through one of the objectives is coherently superposed at the object and/or on at least one of the light detectors with light passing through one of the other objectives at the object so that it interferes.

In the scanning light microscope known from DE-OS 43 26 473, two objectives are preferably arranged in such a way that their axes are perpendicular to one another, and one objective is used for the illumination of the specimen, while the second objective is used for the observation of the specimen. An improved resolution is achieved due to the fact that the illumination axis which is determined by the optical axis of the objective used for illumination is arranged perpendicular to the observation axis which is determined by the optical axis of the objective used for observation.

The high resolution is brought about in the following manner: The intensity distribution in the focal range is described by the illumination point spread function (PSF). The detection probability for the light proceeding from the focal range is described by the observation PSF when using a detection pinhole diaphragm. The PSF of a confocal microscope is the product of the illumination PSF and the observation PSF. The more extensive or spread out it is, the poorer the resolution of the microscope. Due to the approximately perpendicular arrangement of the illumination axis and the observation axis relative to one another, the large extension of the illumination PSF along its axis is compensated for by the small extension of the illumination PSF along this axis, so that a resolution of approximately equal quality is achieved along all three spatial axes.

According to another embodiment form of the scanning light microscope known from DE-OS 43 26 473, three objectives are arranged in such a way that the axes of two objectives are perpendicular to one another, while the axis of the third objective lies on the axis of one of the other two objectives. In this case, the light passing through one of the objectives is coherently superposed on the object and/or on one of the light detectors with light passing through one of the other objectives, so that it interferes. In the case of interference of the illumination light, the high resolution is brought about in the following manner: The illumination PSF is modulated by an interference pattern due to interference along the illumination axis of the two illumination beams entering from opposite directions, insofar as the illumination beams are coherent. If the phase difference between the two illumination partial beams in the focal point is equal to zero or is a whole-number multiple of 21, the interference in the geometric focal point is structural and the illumination PSF is formed of a spatially sharply delimited principal maximum and a plurality of secondary maxima along the illumination axis which would reduce resolution if they could not be suppressed. The confocal PSF which is the product of the illumination PSF and the observation PSF is also modulated by the interference along the illumination axis. However, the secondary maxima are suppressed by the vertical observation through the third objective, so that the confocal PSF has an axial extension which is essentially determined by that of the principal maximum of the illumination PSF. This is synonymous with a high resolution.

Further, a double-objective system with two objectives is known from the German Patent Application 196 29 725.7, wherein one objective serves to focus illumination light and the other serves to collect observation light. The observation axis of the second objective is at an angle to the illumination axis of the first objective. In this way, according to the optical principle described in DE-OS 43 26 473, an improved resolution is achieved. In contrast to the construction described in DE-OS 43 26 473 with complete separation of the illumination beam paths and observation beam paths, the double-objective system from Patent Application 196 29 725.7 enables the realization of the optical principle described in DE-OS 43 26 473 in an available light microscope. In this case, the customary individual objective in the conventional light microscope is exchanged for the double-objective system.

In contrast, the present invention shows a way in which the optical principle described in DE-OS 43 26 473 can be realized in an available scanning light microscope with only one objective.

OBJECT AND SUMMARY OF THE INVENTION

Therefore, it is the primary object of the present invention to propose a beam deflecting unit which, on the one hand, enables the illumination of the specimen by one or more beams from several sides and/or observation of the specimen by one or more beams from several sides and, on the other hand, enables the observation (of the specimen at an angle to the illumination axis. In this way, the achievable resolution according to the optical principle described in DE-OS 43 26 473 is improved and the confocal observation volume is smaller compared to known comparable scanning light microscopes. The object is to design the beam deflecting unit in such a way that it can be used in available scanning light microscopes with one objective.

According to the invention, this object is met in that the deflecting elements (mirrors) are arranged between the microscope objective and the focal plane in such a way that a collimated light beam entering the objective, depending on the angle of incidence in the entrance aperture of the objective, illuminates the specimen in the focal point from a different direction (this direction is the illumination axis) and a beam bundle proceeding from the focal point, depending on the direction (this direction is the observation axis), exits the objective as a collimated light beam at a different exit angle.

With a view to the sought for high resolution, the deflecting elements are preferably arranged in the beam paths in such a way that the illumination axis and the observation axis are perpendicular to one another. However, the advantages of the invention are also still achieved to a sufficient extent when the angle diverges from a right angle by a not excessive amount. The deflecting elements are preferably structurally combined to form a beam deflecting unit.

The beam deflecting unit according to the invention can be used in a fluorescence microscope. But it can also be used in a microscope operating with scattered light.

The objective that is used is preferably one with a high numerical aperture which is not corrected for the use of cover slips. The specimens are preferably provided at the tip of a thin capillary. When using an objective that is corrected for the use of cover slips, a cover slip can be introduced between the objective and the beam deflecting unit according to the invention or between the objective and the specimen. When using an objective requiring an immersion medium, the space between the objective and the specimen can be filled with an immersion medium.

The beam deflecting unit is advantageously located on an object carrier which is arranged on the object stage of the microscope. The beam deflecting unit can accordingly be adjusted by moving the object stage. The movement of the specimen is advantageously carried out by an additional adjusting element which is independent from the object stage. This adjusting element can be an adjusting stage which allows scanning of the specimen through the focal point in three dimensions, so that a recording of the specimen with high resolution is possible in one or more dimensions.

The invention is explained more fully hereinafter with reference to the accompanying drawings.

BRIEF DESCRIPTION OF THE DRAWINGS

In the drawings

FIG. 1 is a schematic view of the beam path in a particularly preferred embodiment form of the beam deflecting unit according to the invention, wherein the specimen is illuminated from one direction and the observation is carried out perpendicular to the illumination axis, wherein the right angle lies in a plane containing the optical axis of the objective;

DESCRIPTION OF THE PREFERRED EMBODIMENTS

Figure 2:
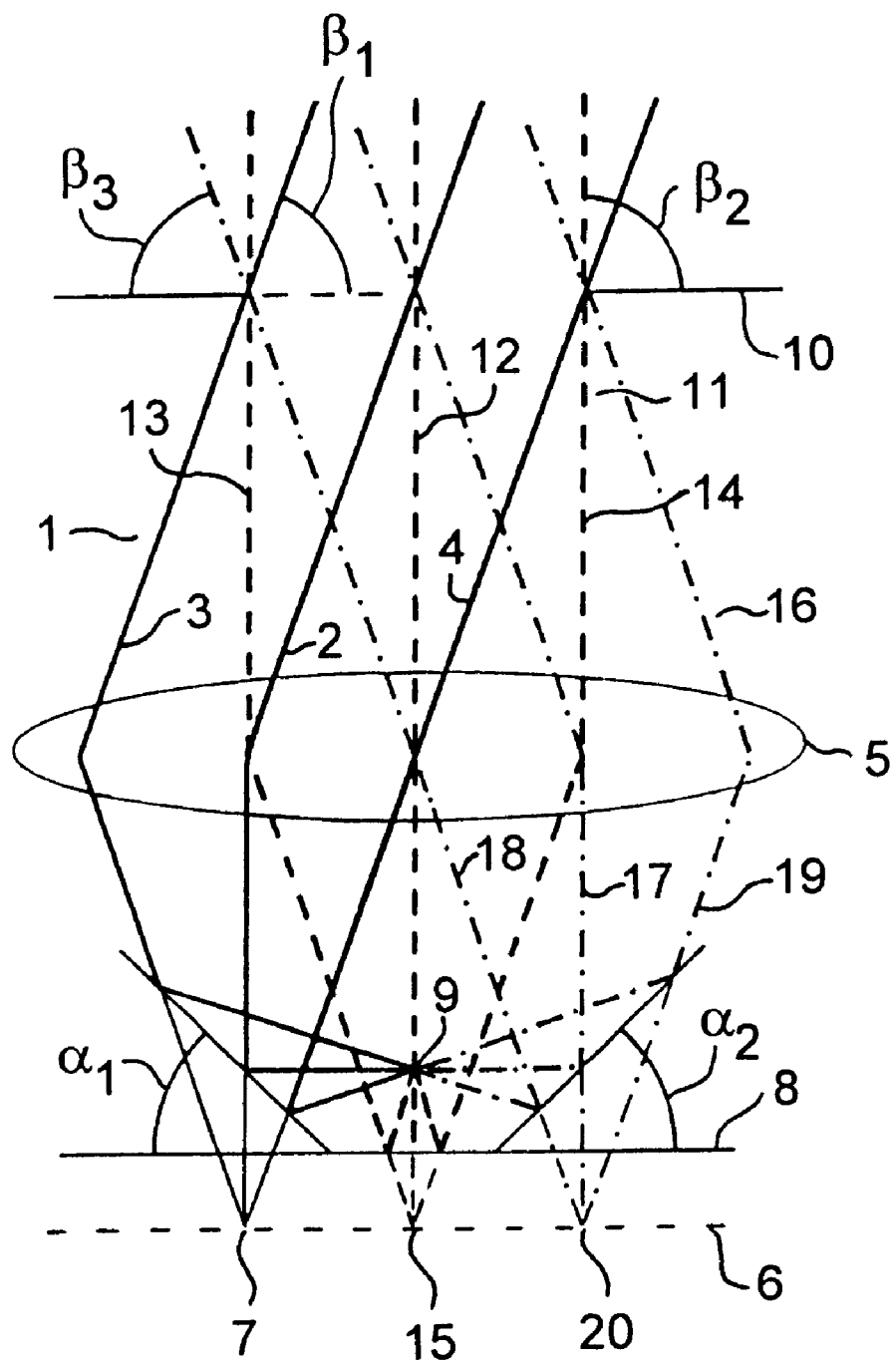
FIG. 2 is a schematic view of the beam path in a particularly preferred embodiment form of the beam deflecting unit according to the invention, wherein the specimen is illuminated from two opposite directions and the observation is carried out perpendicular to the illumination axis.

FIG. 1 shows the arrangement of the beam deflecting unit according to the invention for a preferred embodiment form in which the illumination axis and the observation axis are perpendicular to one another, wherein the right angle between them lies in a plane which contains the optical axis of the objective. The illumination beam path 1 from a light source 31 through illumination optics 27, 28 and a mirror 24 as well as lens 23 is represented by three beams shown in solid lines: a central beam 2 and two peripheral beams or edge beams 3 and 4, The illumination beam is focussed through the microscope objective 5 in the focal plane 6, and the individual beams 2, 3 and 4 would intersect in the focal plane 6 at a point 7 without the beam deflecting unit. This beam configuration is shown in part by thin lines. When the beam deflecting unit 8, according to the invention, which comprises at least two mirror surfaces which change the beam direction and lie at angles al, a2 relative to the perpendicular to the optical axis of the objective 5 is introduced between the objective 5 and the focal plane 6, the beams 2, 3 and 4 are reflected and combine at a point 9. The central beam 2 shows the position of the illumination axis.

When the collimated illumination beam enters the entrance aperture 10 of the microscope objective 5 obliquely (incidence angle $\beta_1$), the virtual focal point 7 in the focal plane 6 does not lie on the optical axis of the objective 5. By means of a suitable distance of the beam deflecting unit 8 from the focal plane 6 and a corresponding angle of inclination $\alpha_1$ of the beam deflecting unit 8, it can be achieved that the focal point 9 lies, for example, on the optical axis of the objective 5.

The observation beam path 11 can be configured so as to be partially symmetric to the illumination beam path 1 (shown in dotted lines). The central beam 12, which proceeds from the illumination focal point 9 and which shows the position of the observation axis, and the edge beams 13 and 14 impinge on the beam deflecting unit 8 according to the invention and are deflected at the latter. They are collimated by the microscope objective 5 by a corresponding distance of the beam deflecting unit 8 from the focal plane 6 and a corresponding angle of inclination $\alpha_2$ of the beam deflecting unit 8. The beams 12, 13 and 14 pass through the exit aperture of the objective 5 at an exit angle $\beta_2$ and travel through the lens 23 and optics 25, 26 to reach the detector 30, in front of which is arranged a pinhole 29.

Without the beam deflecting unit, the beams 12, 13 and 14 would intersect at a point 15 in the focal plane 6. This beam configuration is shown by thin lines.

The construction is advantageously symmetric, and $\alpha_1$ and $\alpha_2$ are equal. If angles $\alpha_1$ and $\alpha_2$ are each 22.5°, the central beams 2 and 12 which define the illumination axis and the observation axis meet at a right angle to one another.

The focal point 9 must not lie on the optical axis of the microscope objective 5 so that the illumination axis and observation axis are perpendicular to one another. In this case, the construction loses its symmetry. A symmetrical construction is advantageous because of the large distance of the focal point 9 from the mirror surfaces of the beam deflecting unit 8.

The beam deflecting unit 8 is preferably movable, so that the position of the illumination focal point and observation focal point can be adjusted. The angles of inclination $\alpha_1$ and $\alpha_2$ can advantageously be changed.

The illumination beam path and the observation beam path enter the entrance aperture and exit aperture 10 of the microscope objective 5 at an incidence angle $\beta_1$ and exit angle $\beta_2$, respectively. These angles are preferably equal. The course of the illumination beam path and observation beam path corresponds to the course of the beam paths in beam scanning in an available scanning light microscope. The illumination beam path and observation beam path usually have the same course in a microscope of this kind. The separation of the two beam paths when using the beam deflecting unit according to the invention can be carried out, for example, by means of suitable displacement of the point illumination source (not shown) and the point detector (not shown).

The specimen to be examined is located in a common focal point 9 of the illumination beam path and observation beam path. A complete one-dimensional, two-dimensional or three-dimensional recording of the specimen is carried out either by scanning the specimen (object scanning) or by scanning the common focal point 9 through the specimen (beam scanning). If object scanning is; carried out along one or more axes, the specimen is located on a stage 21, in this case, a holder 21 which enables advantageous optional translation and/or rotation of the specimen by means of a scanning stage 22. If beam scanning is provided, the scanning unit of the available microscope moves the illumination beam path and observation beam path in a known manner such that the illumination focal point and observation focal point are moved through the specimen under controlled conditions. Object scanning and beam scanning can be combined.

According to the principle of the known scanning light microscope described in DE-OS 43 26 473, an available microscope which is outfitted with this embodiment form of the beam deflecting unit according to the invention enables recordings with the highest resolution that a far-field optical light microscope can have without the use of interference.

FIG. 2 shows the arrangement of the beam deflecting unit according to the invention for a preferred embodiment form in which the specimen is illuminated from two opposite directions and the observation is carried out perpendicular to the illumination axis. In this case, the interference of the illumination light beams in the focal range is utilized to improve resolution.

In FIG. 1, an illumination beam path 1 is shown by three beams 2, 3 and 4 in solid lines. The illumination beam entering the entrance aperture 10 obliquely (incidence angle $\beta_1$) is focussed by the microscope objective 5. The beams 2, 3 and 4 are reflected by the beam deflecting unit 8 according to the invention and combine at a point 9. A second illumination beam path 16 is shown by the three beams 17, 18 and 19 in dashed lines. This second illumination beam path 16 likewise enters the entrance aperture 10 obliquely (incidence angle $\beta_3$) and is focussed by the objective 5 on a virtual focal point 20 in the focal plane 6. The beams 17, 18 and 19 are reflected by the beam deflecting unit 8 according to the invention and combine in the illumination focal point of the first beam path 9 by means of a corresponding distance of the beam deflecting unit 8 from the focal plane 6 and due to a corresponding angle of inclination $\alpha_2$ of the beam deflecting unit 8.

The illumination beam path 11 is shown in a dotted line as in FIG. 1. The beams 12, 13 and 14 proceeding from the common illumination focal point 9 are reflected by the beam deflecting unit 8 according to the invention at a corresponding distance from the focal plane 6 and are collimated by the microscope objective 5.

The construction is advantageously symmetric, and $\alpha_1$ and $\alpha_2$ are equal. When angles $\alpha_1$ and $\alpha_2$ are both 45°, the central beams 2 and 17 which define the illumination axes meet at the illumination focal point 9 in opposite directions. When angle $\alpha_2=0°$, the construction corresponds to an embodiment form of the beam deflecting unit according to the invention as is shown in FIG. 1.

The illumination beam paths enter the entrance aperture 10 of the microscope objective 5 at incidence angles $\beta_1$ and $\beta_3$. These angles are preferably equal. The observation beam path exits the exit aperture 10 of the objective 5 at an exit angle $\beta_2$. These angles are preferably 90°. The course of the two illumination beam paths corresponds to the course of the beam scanning in an available scanning light microscope. The separation of the two illumination beam paths when the beam deflecting unit according to the invention is used can be carried out, for example, by means of a double-point illumination source or by a prism in the common illumination beam path inside the microscope.

The illumination and observation can also be exchanged. The illumination beam paths can also be used as observation beam paths and the observation beam path can be used as illumination beam path, so that the specimen is observed from two opposite directions perpendicular to the illumination axis.

As in FIG. 1, the specimen to be examined is located in the common focal point 9 of the illumination beam path and observation beam path. A one-dimensional, two-dimensional or three-dimensional recording of the specimen is preferably carried out by object scanning along one or more axes.

An available microscope which is outfitted with this embodiment form of the beam deflecting unit according to the invention enables recordings with the highest resolution with the use of interference in accordance with the principles or known scanning light microscopes which are described in DE-OS 40 40 441 and DE-OS 43 26 473.

Figure 3:
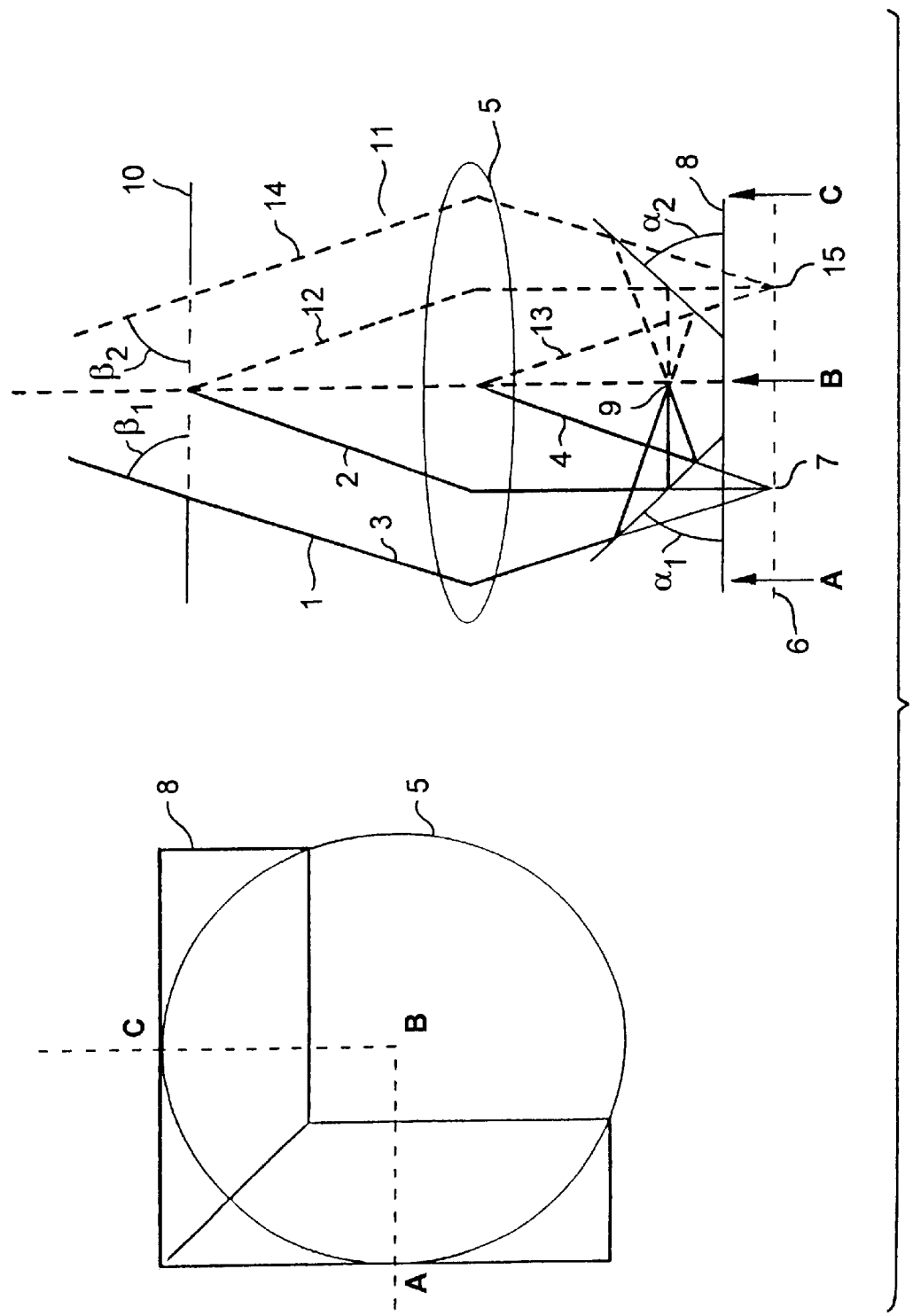
FIG. 3 is a schematic view of the beam path in a particularly preferred embodiment form of the beam deflecting unit according to the invention, wherein the specimen is illuminated from one direction and the observation is carried out perpendicular to the illumination axis, wherein the right angle lies in a plane on which the optical axis of the objective is perpendicular.

FIG. 3 shows the arrangement of the beam deflecting unit according to the invention for a preferred embodiment form in which the illumination axis and observation axis are perpendicular to one another, wherein the right angle lies in a plane on which the optical axis of the objective extends vertically. The Figure shows a view of the embodiment form from above (along the optical axis of the objective) (at left) and a view of the embodiment form from the side (as in FIGS. 1 and 2), wherein the section follows line ABC shown in dashes in the view at left.

The illumination and observation beam paths 1 and 11 are shown in the same way as in FIG. 1. The collimated illumination beam (2, 3, and 4) enters the entrance aperture 10 of the objective 5 obliquely (incidence angle $\beta_1$) The light is focussed through the objective 5 in the illumination focal point 9 by the deflection of the illumination beams 2, 3 and 4 through the beam deflecting unit 8 according to the invention. In this case, the deflection is carried out in such a way that the central beam 2 extends perpendicular to the optical axis of the objective 5 after reflection.

The illumination beams 12,13 and 14 proceeding from the illumination focal point 9 are reflected by the beam deflecting unit 8 and collimated by the objective 5. The path of the observation beams 12, 13 and 14 corresponds to the path of the illumination beams 2, 3 and 4. The observation is carried out in such a way that the central observation beam 12 between the focal point 9 and the impingement on the beam deflecting unit 8 extends perpendicular to the central illumination beam 2 and perpendicular to the optical axis of the objective 5. The right angle between the illumination axis and observation axis is therefore angle CAB.

The observation beams pass through the exit aperture 10 at an exit angle $\beta_2$. In contrast to the embodiment form in FIG. 1, the exit angle $\beta_2$ does not lie in the plane containing the incidence angle $\beta_1$ (the plane that is plotted by point A and the optical axis of the objective), but rather in the plane which is plotted by point C and the optical axis.

In this special embodiment form, angles $\alpha_1$ and $\alpha_2$ are equal. Angles $\beta_1$ and $\beta_2$ are likewise equal.

By means of expanding the beam deflecting unit, this special embodiment form can easily be expanded such that three or four beam paths meet at focal point 9. For this purpose, one or two additional (inclined) deflecting elements are added to the deflecting elements (mirror surfaces) that are inclined by $\alpha_1$ or $\alpha_2$. By combining the embodiment forms in FIG. 2 and FIG. 3, five beam paths can also be guided in such a way that they meet in their common focal point 9. The beam paths can be used as illumination beam paths or as observation beam paths.

The course of the illumination and observation beam paths in this special embodiment form likewise corresponds to the course of the beam paths in beam scanning in an available scanning light microscope. The separation of the beam paths can be carried out, for example, by suitable displacement of the point illumination source (not shown) or of the point detector (not shown).

While the foregoing description and drawings represent the present invention, it will be obvious to those skilled in the art that various changes may be made therein without departing from the true spirit and scope of the present invention.

What is claimed is:

1. A microscope, comprising:

an objective having a focal plane;

a beam deflecting unit having an illumination axis and an observation axis; said beam deflecting unit being located between the objective and the focal plane and being adapted to enable at least one of illumination of a specimen by beams from several sides and observation of the specimen by beams from several sides; said beam deflecting unit further being adapted to enable observation of the specimen at an angle to the illumination axis, wherein a focal point of the beams at the specimen is located between the objective and the focal plane of the objective.

2. The microscope according to claim 1, wherein the beam deflecting unit includes means to permit rotation about an optical axis of the microscope.

3. The microscope according to claim 1, wherein the angle between the illumination axis and the observation axis is approximately 90°.

4. The microscope according to claim 1, wherein the angle between the illumination axis and the observation axis can be varied.

5. The microscope according to claim 1, wherein two of the beam paths are deflected in such a way that their axes are collinear in the focal point of the microscope objective, so that a specimen is illuminated or observed from opposite directions.

6. The microscope according to claim 1, wherein the beam deflecting unit includes optical elements that can be varied or displaced.

7. The microscope according to claim 1, wherein said microscope is a fluorescence microscope.

8. The microscope according to claim 1, wherein said microscope is arranged for the observation of at least one of scattered light and reflected light.

9. The microscope of claim 1, wherein the microscope is a confocal scanning light microscope.

10. The microscope of claim 1, wherein the beam deflecting unit is comprised of first and second mirrors, said first mirror deflecting beams from said objective to a focal point located at said specimen and said second mirror deflecting beams from said focal point to said objective.

11. The microscope of claim 1, wherein the beam deflecting unit is adapted to only deflect beams that do not extend on an axis of symmetry of said specimen.

* * * * *